US008069119B2

(12) United States Patent
Curren

(10) Patent No.: US 8,069,119 B2
(45) Date of Patent: Nov. 29, 2011

(54) SYSTEM AND METHOD FOR SOFTWARE LICENSE MANAGEMENT FOR CONCURRENT LICENSE MANAGEMENT AND ISSUANCE

(76) Inventor: Edward Curren, Woodbridge, VA (US)

( * ) Notice: Subject to any disclaimer, the term of this patent is extended or adjusted under 35 U.S.C. 154(b) by 165 days.

(21) Appl. No.: 12/402,569

(22) Filed: Mar. 12, 2009

(65) Prior Publication Data

US 2009/0177740 A1  Jul. 9, 2009

Related U.S. Application Data

(62) Division of application No. 11/695,338, filed on Apr. 2, 2007, now abandoned.

(51) Int. Cl.
*G06F 21/00* (2006.01)
(52) U.S. Cl. ........... 705/59; 709/203; 713/189; 713/194
(58) Field of Classification Search .................. None
See application file for complete search history.

(56) References Cited

U.S. PATENT DOCUMENTS

| | | | |
|---|---|---|---|
| 5,138,712 A | 8/1992 | Corbin | |
| 5,553,143 A | 9/1996 | Ross et al. | |
| 5,615,269 A * | 3/1997 | Micali | 705/80 |
| 5,671,412 A | 9/1997 | Christiano | |
| 5,790,664 A * | 8/1998 | Coley et al. | 709/203 |
| 6,189,145 B1 | 2/2001 | Bellin, Jr. et al. | |
| 6,260,141 B1 | 7/2001 | Park | |
| 6,574,612 B1 | 6/2003 | Baratti et al. | |
| 6,901,386 B1 * | 5/2005 | Dedrick et al. | 705/59 |
| 7,013,294 B1 | 3/2006 | Sekigawa et al. | |
| 7,111,161 B2 * | 9/2006 | Sugita et al. | 713/2 |
| 2002/0091645 A1 | 7/2002 | Tohyama | |
| 2005/0049973 A1 * | 3/2005 | Read et al. | 705/59 |
| 2005/0102240 A1 | 5/2005 | Misra | |

* cited by examiner

*Primary Examiner* — Jamie Kucab
(74) *Attorney, Agent, or Firm* — White-Welker & Welker, LLC; Matthew T. Welker, Esq.

(57) ABSTRACT

The present invention is a method and system for software license management. The License Management System (LMS) is comprised of three components. These three components are the License Client (LC), the License Server (LS) and the Network License Manager (NLM). For the system to function the LC and LS are required. The NLM exists to facilitate and manage concurrent license usage.

11 Claims, 14 Drawing Sheets

SYSTEM AND METHOD FOR SOFTWARE LICENSE MANAGEMENT FOR CONCURRENT LICENSE MANAGEMENT AND ISSUANCE

CROSS REFERENCE TO RELATED APPLICATIONS

This application is a divisional of U.S. patent application Ser. No. 11/695,338, entitled "System and Method for Software License Management for Concurrent License Management and Issuance", filed on Apr. 2, 2007 now abandoned. The benefit under 35 U.S.C. 121 of which is hereby claimed, and the aforementioned application is hereby incorporated by reference.

FEDERALLY SPONSORED RESEARCH

Not Applicable

SEQUENCE LISTING OR PROGRAM

Not Applicable

TECHNICAL FIELD OF THE INVENTION

The present invention relates generally to a system and method for software license management. More specifically the present invention relates to a system and method for software license management for concurrent license management and license issuance.

BACKGROUND OF THE INVENTION

The present invention is method and system for software license management. Many other software license management systems are taught or known in the prior art, but each has their own respective shortcomings on which the present invention improves or eliminates in addition to the additional elements taught by the present invention.

U.S. Pat. No. 7,013,294 discloses a license management system for software which drives a single computer or a plurality of computers including: an application program for requesting a decision of the number of license which it needs to drive itself and for receiving issuance of the license; a number of license decision unit for determining the necessary number of licenses in accordance with the request from the application program; and a license management unit for issuing the number of licenses which was determined by the number of license decision unit. According to this invention, it is possible to provide a license management system enabling issuance of a license in which the sales strategy of a software maker was considered.

In U.S. Pat. No. 6,574,612 a method and system for providing flexibility to a license management system is disclosed. This license management system permits the concurrent use of multiple copies of a software program over a network comprising a plurality of client workstations, each client workstation having a copy of the software program installed thereon requiring an authorization from one of a plurality of license servers each time the software program is used. For security reasons, the license management system requires that at least the integer majority of the plurality of license servers is active at any time. This method and system allows a change to the number of license servers, but imposes several limitations.

U.S. Pat. No. 5,138,712 teaches a software application wherein the verification and license check out functions which are normally performed by a license server of a network software license system. The encrypted license information is contained in a license token, and is sorted in the database controlled by the license server. In contrast to the prior art where the license server either grants or denies the request after verifying the user's credentials, the license server here finds the correct license token for the software application and transmits the license token to the licensing library.

U.S. Pat. No. 5,553,143 allows for the electronic management and enforcement of software licenses used only in a network or non-network environment to facilitate product licensing and upgrades. Further, it only accommodates the use of compact disc read-only memory (CD ROM) product distribution.

U.S. Pat. No. 5,671,412 teaches an improved software license management system wherein a license server initializes a license database by receiving a package license description that includes component license descriptions for component software products in a package. A client computer system can request a license for a component product in a package. A license is granted to the client when the client is allowed to receive the license according to a license policy.

U.S. Pat. No. 6,189,145 teaches a software licensing system includes a license generator located at a licensing clearinghouse and at least one license server and multiple clients located at a company or entity. When a company wants a software license, it sends a purchase request (and appropriate fee) to the licensing clearinghouse. The license generator at the clearinghouse creates a license pack containing a set of one or more individual software licenses.

U.S. Pat. No. 6,260,141 teaches a software license control system based on independent software registration servers. The registration servers are open to all software manufacturers. On user's computer, a software product asks the user software license control program whether the user has a usage license for the software product. The user license control program checks the license file, received from a software registration server, and answers the software product.

U.S. Patent Application Publication 20020091645 discloses a licensing system comprising an application information database into which a license management server machine stores a license menu containing a function, a term and a number of times and the like for which usage may be approved with respect to software to be usage-approved. A user terminal is capable of accessing the application information database via an Internet network. Therefore, according to this system o, a software license granting technique is provided in which a range of software licensing choices is expanded so that various user needs can be met even with the same single software, and unlawful copying of the software that is approved for use by the user can be eliminated.

U.S. Patent Application Publication 20050102240 discloses a software licensing system includes a license generator located at a licensing clearinghouse and at least one license server and multiple clients located at a company or entity. When a company wants a software license, it sends a purchase request and appropriate fee to the licensing clearinghouse. The license generator at the clearinghouse creates a license pack containing a set of one or more individual software licenses. The license generator digitally signs the license pack and encrypts it with the license server's public key. The license server is responsible for distributing the software licenses from the license pack to individual clients. When a client needs a license, the license server determines the client's operating system platform and grants the appropriate license. The license server digitally signs the software license and encrypts it using the client's public key. The license is stored locally at the client.

Because the system of the present invention is designed to license software it is a natural target for anyone who wants the software and does not want to pay for it. Because this software is a target of "hackers" it must have defenses beyond the ordinary for protecting itself against those who seek to destroy its ability to perform its job of guarding software usage rights as defined by the software company that employs the system of the present invention to safeguard their software. To this end the system of the present invention will always employ the strongest security schema available to it based on the circumstances of the environment in which it is running. To ensure the highest degree of protection the system is designed with multiple layers of security that act independently of the others. While no system is completely secure, the intent of this design is to make the cost of breaking into the system so high as to be impractical.

Therefore it is an objective of the present invention to teach a License Management System (LMS) is, in a best mode, comprised of three components. These three components are the License Client (LC), the License Server (LS) and the Network License Manager (NLM).

It is another objective of the present invention to teach a License Management System (LMS) that, in an alternative embodiment only requires a License Client (LC) and License Server (LS) to properly function.

It is yet another objective of the present invention to teach a License Management System (LMS) further comprised of a Network License Manager (NLM) component that exists to facilitate and manage concurrent license usage and issuance.

SUMMARY OF THE INVENTION

The present invention is method and system for software license management that is recorded on computer-readable medium and capable of execution by a computer. The License Management System (LMS) is comprised of three components. These three components are the License Client (LC), the License Server (LS) and the Network License Manager (NLM). For the system to function the LC and LS are required. The NLM exists to facilitate and manage concurrent license usage. The main patentable elements focus on the concurrent license management and method of license issuance.

The License Server and Network License Manager both provide an API to allow end users to write scripts to implement business rules in the decision making process at critical events in the registration, issuance, or usage of a license or customer. The License Server and Network License Manager both provide an API to allow end users to extend the functionality of the license server and/or network license manager over multiple platform such as Windows operating systems, Unix, Linux, Mac OSX, Solaris, Various cell phone operating systems and various gaming systems such as Sony's PlayStation, Nintendo gaming systems, and Microsoft's Xbox gaming systems with real time notification when the license expires.

The license client provides facilities to run multiple licenses concurrently to enable complex licensing criterion. The License Server and Network License Manager user interfaces provide a graphical method to implement logical business rules. The License Server allows licenses to be revoked or suspended after issuance.

The Network License Manager provides encapsulations of a set of licenses in a logical container, named a license pool. Each pool has a set of configurable attributes that are applied to all licenses contained in that pool. These attributes allow for: the permanent license assignment, online or offline usage of a license, configurable number of missed license to NLM check ins before the license disables itself; and allow or disallow other pools to use a configurable number of licenses in the event that the other pool runs out of available licenses.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

FIG. 9 is a screen shot of the GUI of the present invention showing the customer editor;

FIG. 11 is a screen shot of the GUI of the present invention showing the server's general configuration editor;

DETAILED DESCRIPTION OF THE INVENTION

In the following detailed description of the invention of exemplary embodiments of the invention, reference is made to the accompanying drawings (where like numbers represent like elements), which form a part hereof, and in which is shown by way of illustration specific exemplary embodiments in which the invention may be practiced. These embodiments are described in sufficient detail to enable those skilled in the art to practice the invention, but other embodiments may be utilized and logical, mechanical, electrical, and other changes may be made without departing from the scope of the present invention. The following detailed description is therefore, not to be taken in a limiting sense, and the scope of the present invention is defined only by the appended claims.

Figure 1:
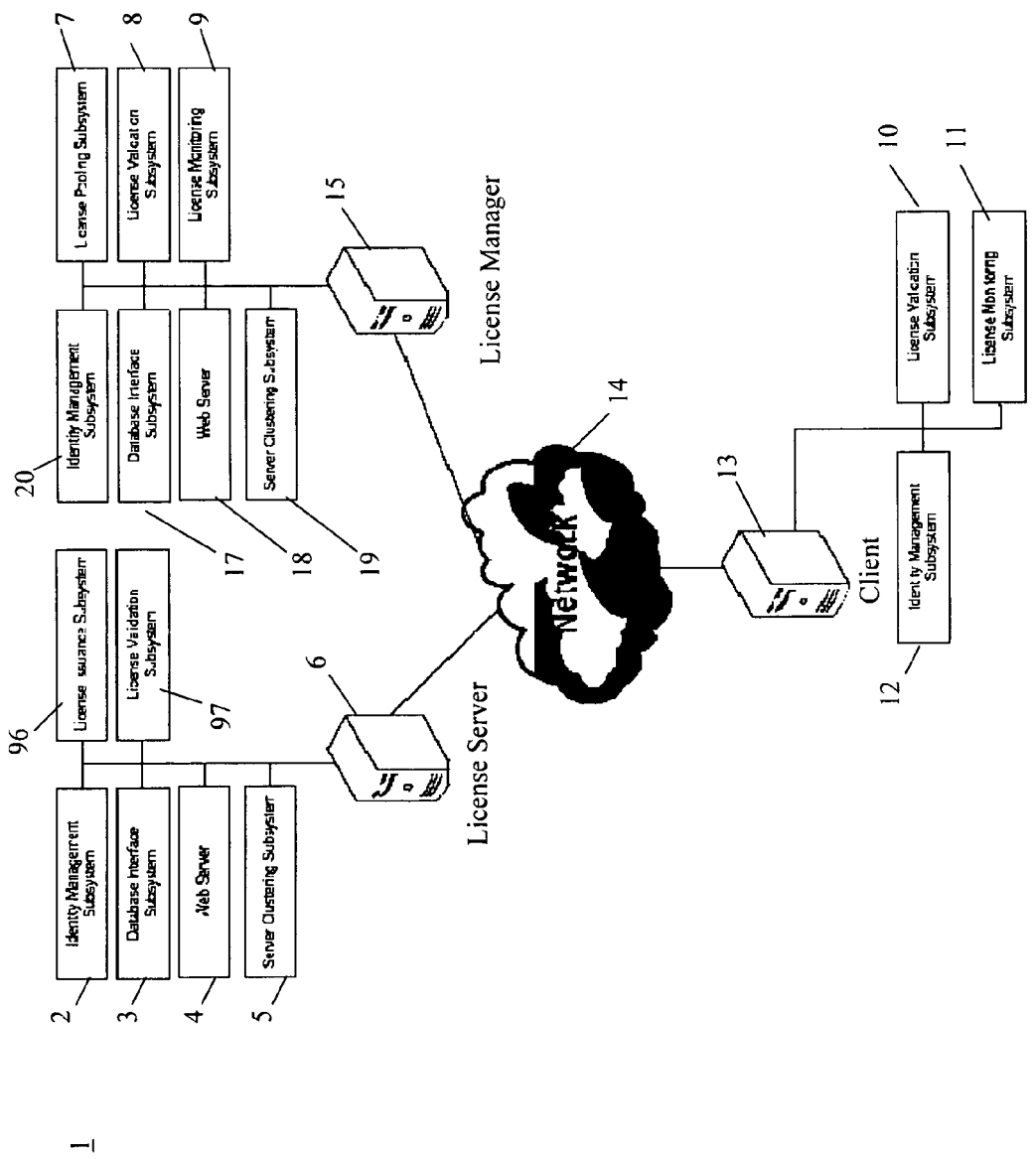
FIG. 1 is a conceptual view of the licensing system of the present invention.

Now referring to FIG. 1, the Licensing System 1 of the present invention is recorded on computer-readable medium and capable of execution by a computer and is comprised of three modules the interact via a multi-user network 14 such as the Internet. These modules are the License Client (LC) 13, the License Server (LS) 6, and the Network License Manager (NLM) 15. For the licensing system to function the License Client 13 and License Server are required. In an alternative embodiment, the Network License Manager 15 exists to facilitate and manage concurrent license usage.

The License Server 6 further consists the following additional components: an identity management system 2, database interference subsystem 3, web server 4, server clustering subsystem 5, license issuance subsystem 96 and license validation subsystem 97. The license manager 15 is further comprised of the following additional components: an identity management subsystem 20, database interference subsystem 17, web server 18, server clustering subsystem 19, license pooling subsystem 7, license validation subsystem 8, and license monitoring subsystem 9. Finally, the Client 13 is further comprised of the following additional components: an identity management subsystem 12, license validation subsystem 10, and license monitoring system 11.

Interaction between the different components of the system is accomplished via messaging. A message is defined as an XML document that conforms to a specific predefined schema. Each message is encrypted and signed for security and authentication purposes. A message is most often transmitted and received via an HTTP or HTTPS connection, although in a few special circumstances a message can be transferred from one component to another via the use of a file.

Figure 2:
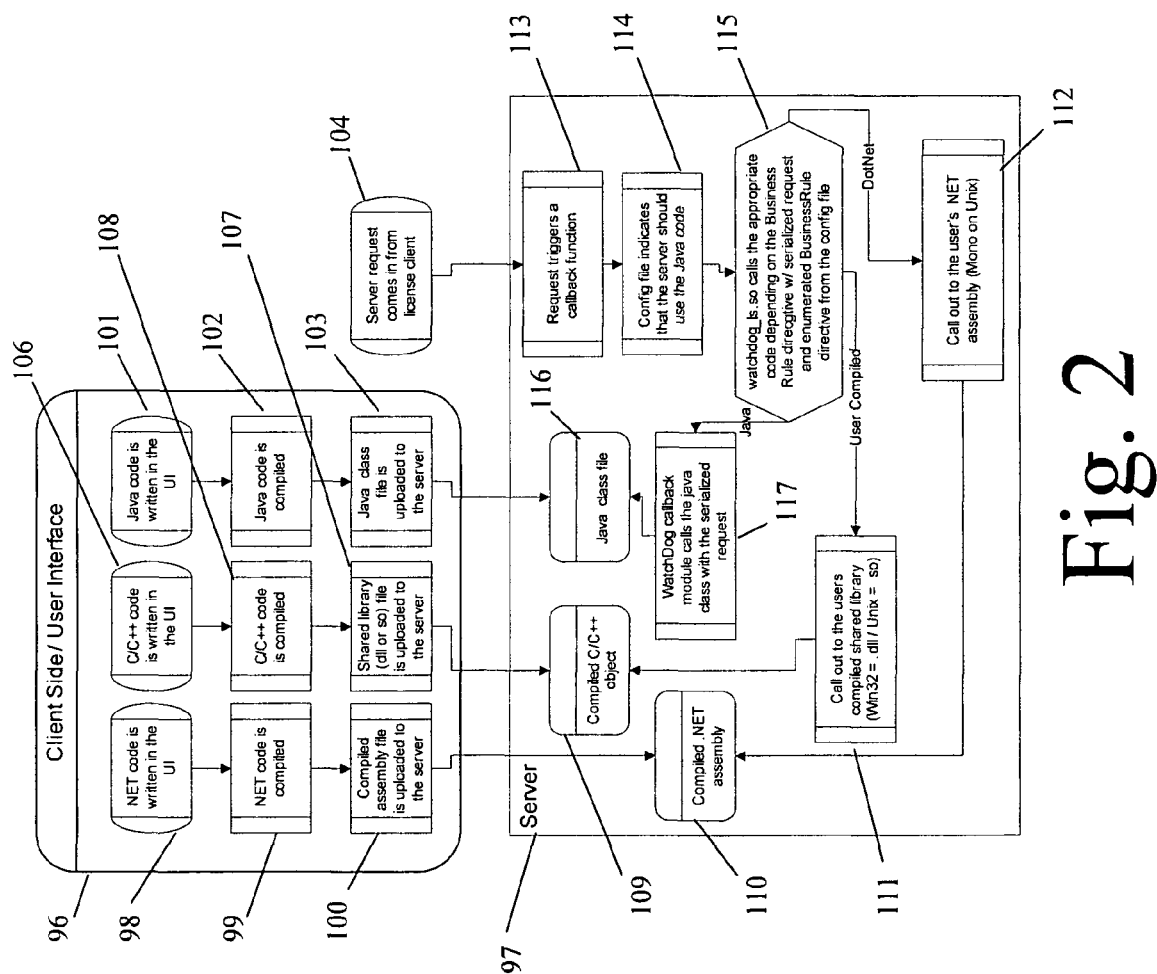
FIG. 2 is a flow chart illustrating Business Rules Callback Processing of the present invention.

Now referring to FIG. 2 a flow chart illustrating the business rules callback processing of the present invention. Business rules callback processing is accomplished via one of three options. When the License Server/Network License Manager starts, it reads a directive named "BusinessRule" from the configuration file. This directive can have four values which are "UserCompiled", "Java", "DotNet", or "NotImplemented". In the case of "NotImplemented" the function will simply return immediately. The Client Side/User Interface 96 consists of three routines, the first is the writing of .NET code to the user interface (UT) 98, which is then compiled 99 and uploaded 100 to the server 97 and its compiled .NET assembly 110; the second is the writing of the C/C++ code to the UI 106, compiled 108, and then uploaded as a shared library or dll file to the server 107 and its compiled C/C++ object 109; and the third is the writing of the java code 101, which is then compiled 102 and uploaded to the server 103 and its Java class file 116.

On the server side 97, a server request is first received from a license client 104, which triggers a callback function 113. The configuration file next indicates that the server should use Java code 114 and then uses a Business Rule Directive from the configuration file to determine if it should continue to use Java or switch to User Compiled or .NET to further process the request 115. If java is continued the system calls the java class with the serialized request 117 and obtains if from the java class file 116. If the serialized request is to be processed via user compiled, the system calls out to the users compiled shared library 111 and obtains the information from the complied C/C++ object 109. If the serialized request is to be processed via .NET, then the system calls out to the user's .NET assembly 112 and obtains the information form the compiles .NET assembly 110.

Figure 3:
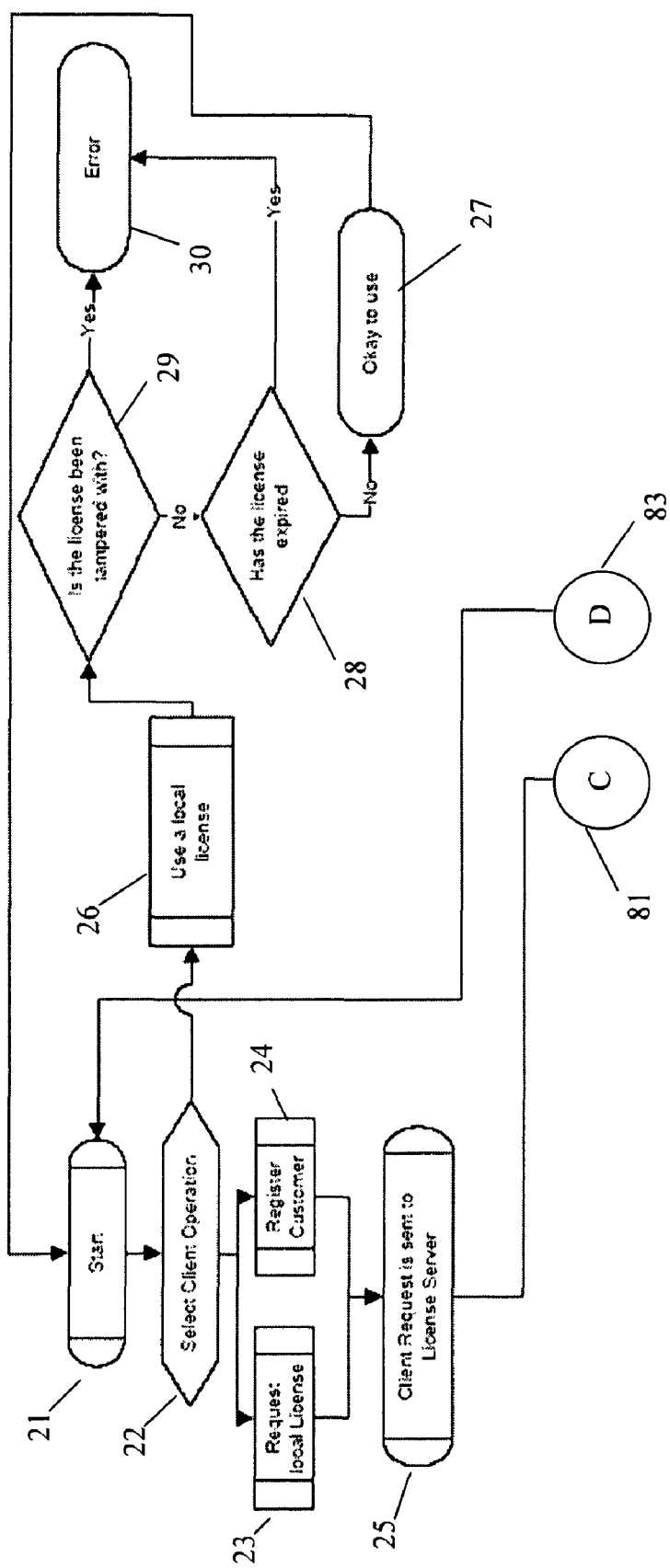
FIG. 3 is a flow chart of the process of the Client Side of the present invention.

FIG. 3 is a flow chart of the process of the Client Side of the present invention. An external request, as shown by continuation point "D" 83 starts 21 the client side process. Once started 21, the first step is to select a client 22 and a request for the local license and customer registration 24 is sent to the license server 25, denoted as continuation point "C" 81. If the client operation selection 22 is to use a local license 26 the system first determines if the license has been tampered with 29. If tampering has occurred an error message 30 is returned and the operation stops. If the license has not been tampered with 29 a second check is made to ensure the license has not expired 28, if expired an error message 30 is returned and the operation stops. If the license has not been tampered with and has not expired it is okay to use 27 and system returns to its start position 21.

Figure 4:
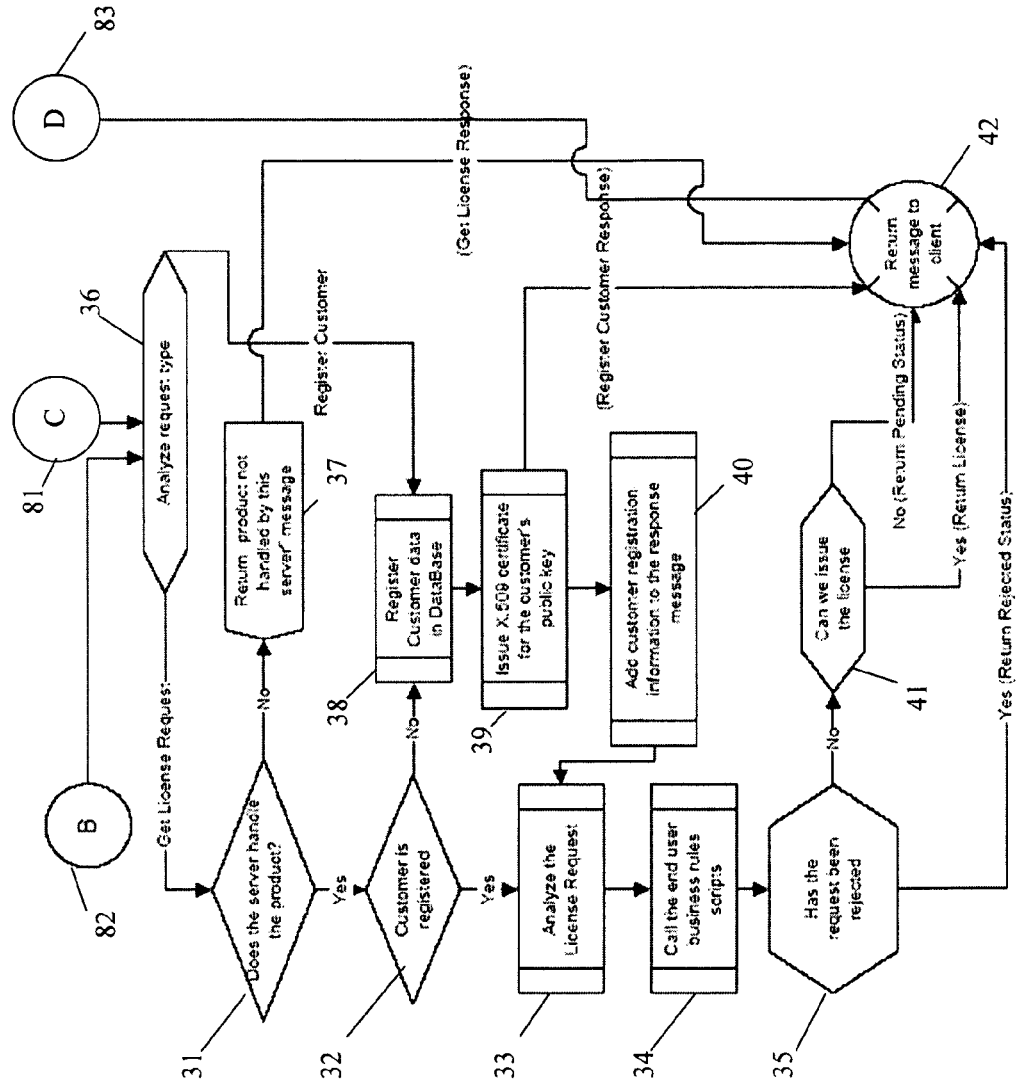
FIG. 4 is a flow chart of the process of the Server Side of the present invention.

Now referring to FIG. 4, a flow chart of the process on the Server Side of the present invention is illustrated. The server side will be initiated from either a request for the local license and customer registration 24 received, denoted as continuation point "C" 81 or from an electronically transmitted file to a customer service representative, denoted as continuation point "B" 82. After initiation, a request type is first determined 36 and the system process the license request and determines if the customer is registered 32 in the database 38. If the customer is not registered a certificate and customer's public key is issued 39 and sent to the client 42, the customer is registered 40 and the analysis of the license continues 33. The system will also determine if the server handles the product of the license request 31, and if so, will continue its analysis, but if not, it will return a response indicating such 37 to the client 42. If the server does handle the product and the customer is registered, the system places a call to the end user business rules script 34 and determines if the request has been rejected 35. If the request has been rejected a message will be sent to the client 42, and if not a determination on whether a license can be issued 41 and the answer returned to the client 42.

Valid license types issued by the system of the present invention includes: unrestricted, limited time evaluation, limited runs evaluation, software lease, and count uses.

The unrestricted license type which places no restrictions on how long the user of the license may continue to use the software.

The Limited Time Evaluation wherein the license will evaluate the License Time Duration, License Time Unit, and License Timer Start variables to create a time span that the license will then compare against the current system time to determine if the license time period has been exceeded, and as such expire itself. As a safeguard against a user simply resetting the system clock to an earlier date, upon use of the license it will check the current system time against the Last Used Date property and validate that the current system time is not earlier than the Last Used Date property. Once validated the Last Used Date will be updated to the current system time.

The system may also incorporate a License Monitor to act as a monitoring process for all licenses in use by clients. If a periodic client license check-in is required for a license or a number of licenses, then this function will monitor the statistics updated by the Update Client Usage Info method. If those statistics exceed allowed values then the license will be declared an orphan and be reclaimed by the NLM. Exceeded statistics means, for example, that the license checked out by the client required that the client call the NLM every five minutes to update the NLM that the client was still alive and active and using the license, and that it could only miss two check-in cycles. If the License Monitor found that the last checking time for the client was ten minutes and one second, then the license would be declared orphaned and reclaimed. Production statistics and real-time monitoring will be on the order of milliseconds, not minutes and seconds.

The Limited Runs Evaluation combines the Number Of Allowed Runs property with the License Run Count property to determine if the license has expired.

The Software Lease checks that two conditions are valid before proceeding. The first condition to be checked is to ensure that the current system date is greater than or equal to the License Valid Star Time property. In the case that the current system time is less than the valid start time the license will return an error message. The second condition to be checked is to ensure that the current system time is less than or equal to the License Valid End Time property. If the current system time is greater than the License Valid End Time property the license will return an error message. As a safeguard against a user simply resetting the system clock to an earlier date, upon use of the license it will check the current system time against the Last Used Date property and validate that the current system time is not earlier than the Last Used Date property. Once validated the Last Used Date will be updated to the current system time. The Count Uses license will increment the License Run Count property.

Figure 5B:
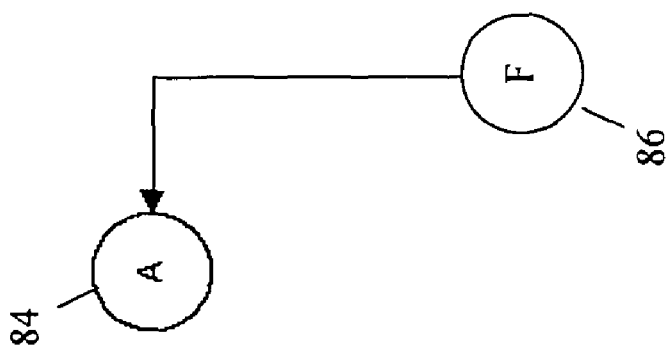
FIGS. 5a and 5b are flow charts of the process of the Client Side of the present invention.
Figure 5A:
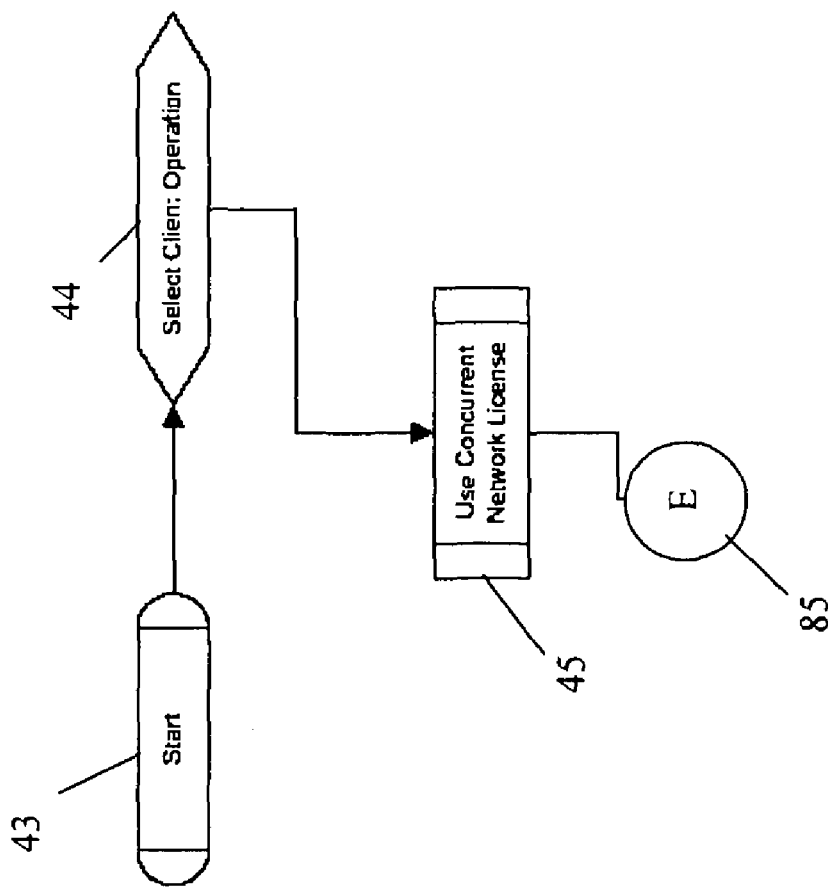

Now referring to FIGS. 5a and 5b, flow charts illustrating of the process of the Client Side of the present invention are shown. If an input is received to start 43 the operation of the present invention, and the selected client operation 44 is for the use of a concurrent network license 45, the system immediately and directly access the network license manager 15, denoted as continuation point "E" 85, for the analysis of the request type 46 and additional process steps of the network license manager 15. At the conclusion of the network license manager's 15 processes a return message is sent to the client 56, denoted as continuation point "F" 86 that is delivered to client 13, denoted as continuation point "A" 84.

Figure 6:
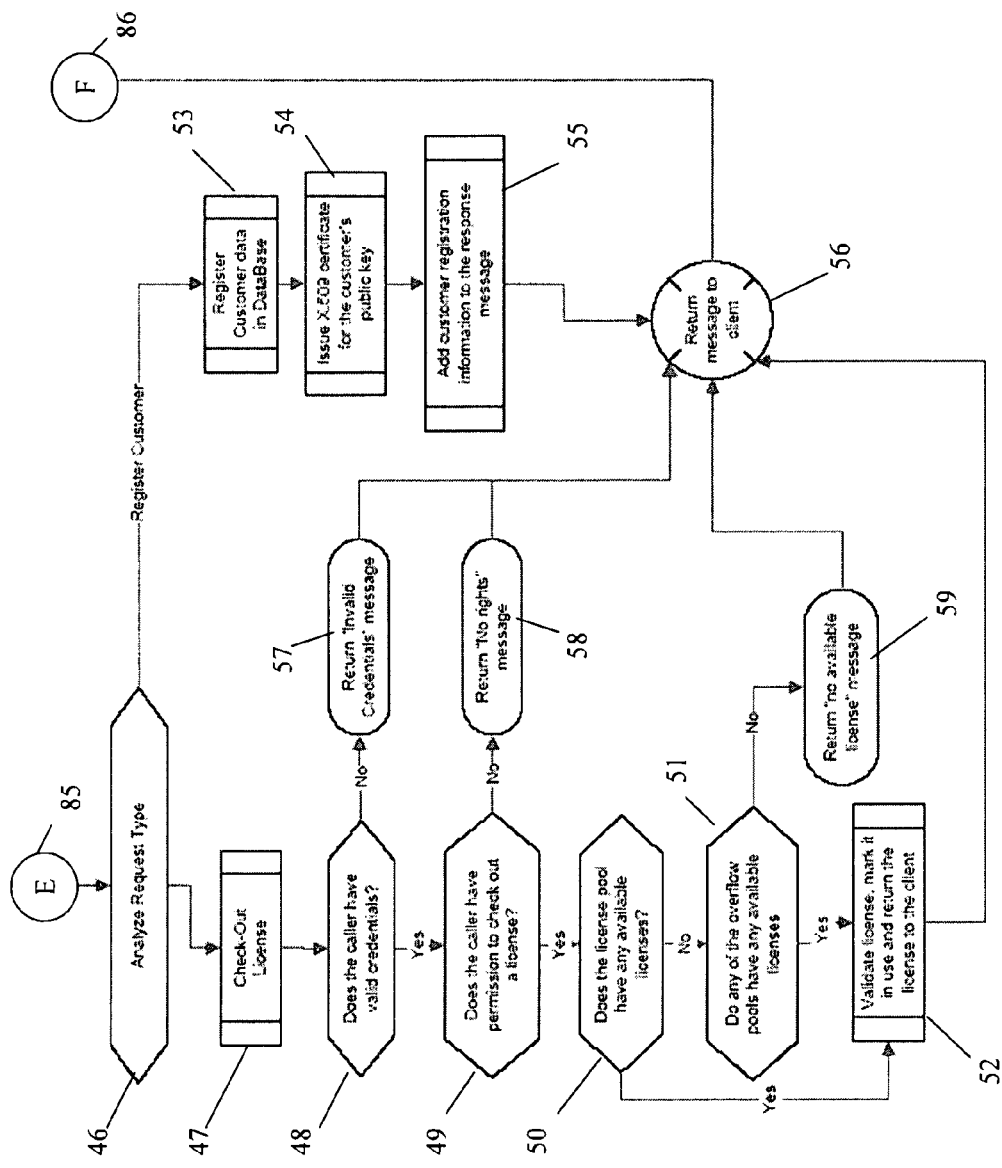
FIG. 6 is a flow chart of the process of the Network License Manager of the present invention.

FIG. 6 is a flow chart of the process of the Network License Manager of the present invention. The network license manager (NLM) is a server that sits on a customer's network and handles the management of concurrent network licenses. One of the fundamental architectural organizations of this server is the concept of license pools. A license pool is a group of licenses that are controlled and allowed to be used based on a set of configuration parameters.

The pool concept is illustrated by the following example. Company XYZ has an NLM installed on its intranet. Three different departments in XYZ have purchased licenses for the same software product, but the funds have come from department budgets rather than an overall company budget. Because of this the Sales and Marketing department does not want the Research and Development department, who have a much higher demand for the limited number of licenses using all of Sales and Marketing's licenses when Sales and Marketing needs to use the software. The Administration department has a number of licenses but does not typically use them often, but must have access to the software when they need it.

In this embodiment there are three license pools. One each for Administration, Sales and Marketing, and Research and Development. Because R&D was getting the username and password for the Sales department's license pool, the Sales department has set the authentication level of their pool of licenses to require registration with the NLM and use the NLM issued PKI X.509 certificate for authentication against the pool before a license may be used by the requester. Sales has also set their maximum number of licenses that may be used in overflow requests to zero effectively turning off the overflow participation of their pool. The Research and Development department's pool has basic username/password authentication, as is the Administration's pool. More over the Administration's pool has their maximum number of licenses that may be used in overflow requests set to minus one (−1) which means that all licenses in the pool are available to overflow requests.

Still referring to FIG. 6, upon receipt of input to the network license manager 15, denoted as continuation point "E" 85, the analysis of the request type 46 is initiated. A check to determine if the customer is registered is run 53. If the customer is not registered a certificate and customer's public key is issued 54 and sent to the client 56, and the customer is registered 55. Concurrently, the license is checked 47 for valid credentials 48 and caller permission to check out the license 48. If the license is invalid 57 or the caller has no rights 58, a message is sent to the client 56. Next a check is done to determine if the license pool has any available licenses 50 and if so a valid license is marked in use and returned to the client 52 in a message 56. If the license pool does not have an available license an overflow pool is checked for available licenses. If an overflow pool license is available a valid license is marked in use and returned to the client 52 in a message 56. If no overflow pool license is available a message stating such 59 is returned to the client 56.

Figure 7:
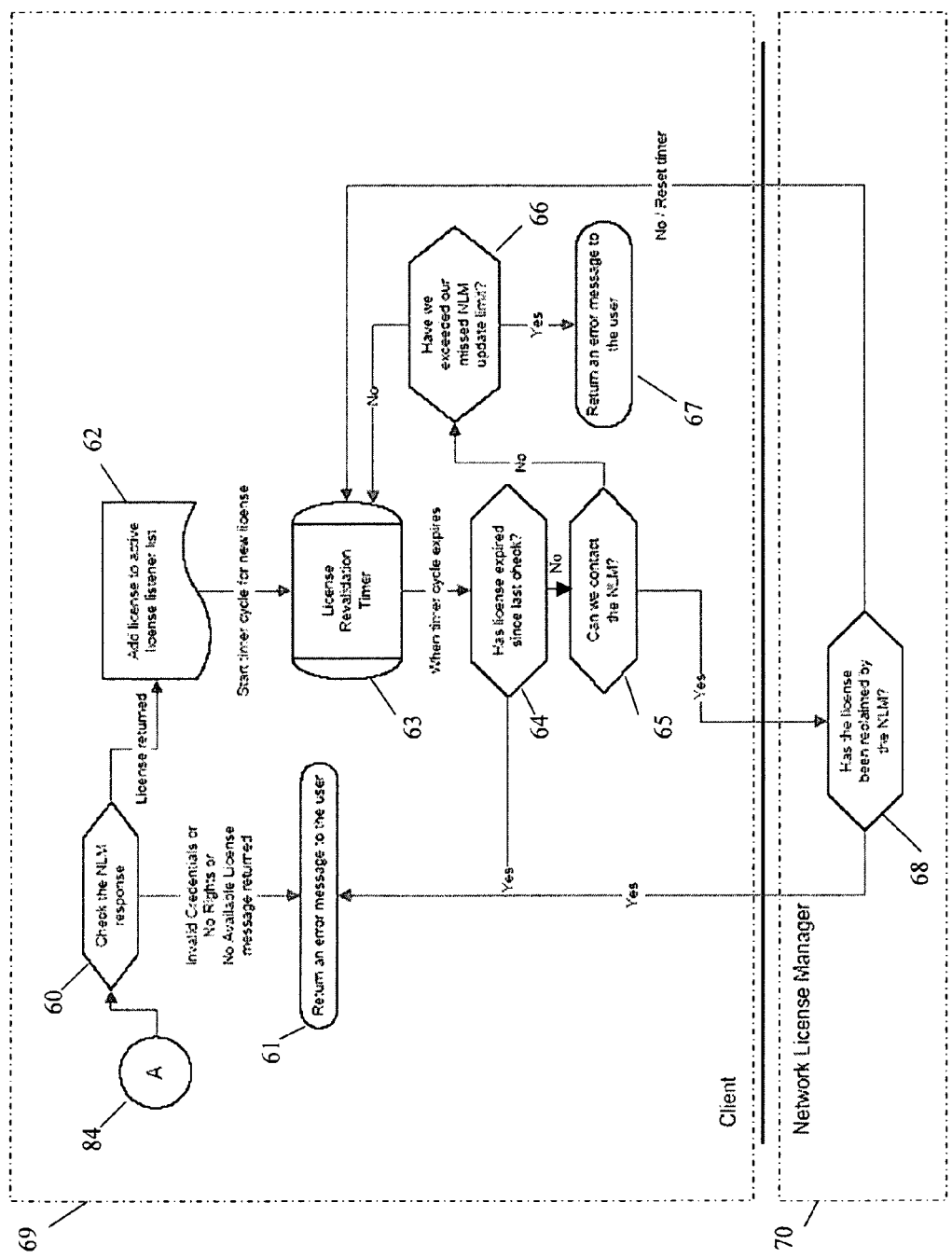
FIG. 7 is a flow chart of the process of the Network License Manager and Client of the present invention.

Now referring to FIG. 7, a flow chart of the process of the Network License Manager 70 and Client 69 of the present invention are illustrated. Upon the client's 69 receipt of a response message from the network license manager, denoted as continuation point "A" 84, a check of the response is started 60. If the response is based on invalid credentials, no rights, or no available license an error message is returned to the user 61. If the response is valid and a license is returned, the license is added to the active license list 62 and the time cycle is started in the license revalidation timer 63. When the timer cycle expires the first step is to determine if the license has expired since the last check 64. If the license has expired an error message is returned to the user 61, if it has not expired the next step is to determine if the network license manager can be contacted 65. If the NLM can not be contacted, then a check is run to determine if the maximum number of missed NLM updates limit has been exceeded 66, if not the process returns to the revalidation timer 63, if it has been exceeded an error message is returned to the user 67. If the NLM is contacted, then a check to determine if the license has been reclaimed by the NLM is run 68. If the NLM has reclaimed the license an error message is returned to the user 61, if not the process returns to the revalidation timer 63.

Figure 8:
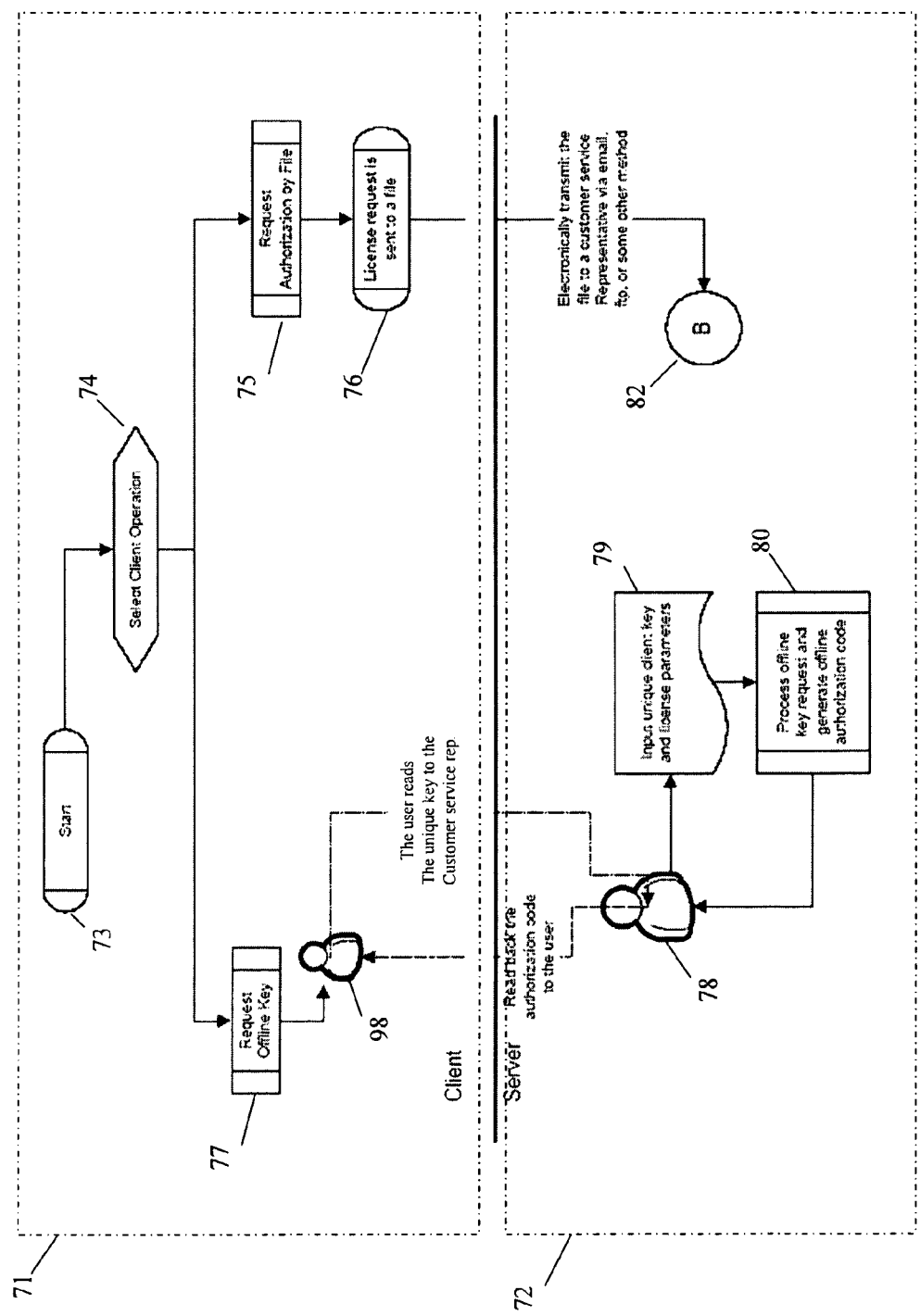
FIG. 8 is a flow chart of the process of the Server and Client of the present invention.

FIG. 8 is a flow chart of the process of the Server 72 and Client 71 of the present invention when a customer service representative or other human interaction is required by a user during the process of the system of the present invention. When a user starts the process 73 on the client side 71 and selects a client operation 74 a request is made by file 75 or an offline key request is submitted 77. The file request 75 is followed by a license request 76 made by a file that is electronically transmitted to a customer service representative 78 who then accesses the server, denoted as continuation point "B" 82 which results in the issuance of an offline license via file transactions. Alternatively, an offline key request 77 may be provided to a customer service representative 78 by the user 98 so that the customer service representative 78 can input the client key and license parameters 79 and process offline the key request and generate and offline authorization code 80 that is then provided to the user 98.

Because this system is designed to license software it is a natural target for anyone who wants the software and does not want to pay for it, this software is a target of "hackers" it must have defenses. Measures to disable the system of the present invention that have been taken into account by this document. One strategy for disabling the present invention is by replacing the DLL libraries. The present invention requires that the present invention DLLs be digitally signed. This signature can then be compared by the employing application and validated that the signature of the DLL it is using matches the known-good signature.

Another method would be the manually writing of a license and feeding it into the present invention system, or altering an existing license. The system of the present invention requires license encryption i to prevent knowledge of the format of the license. Additionally, licenses are signed by the present invention's License Server (LS) that issues them. This LS is also registered with the present invention License Client (LC) that requested the license. Included in this LS registration information is the server's encryption and signature public keys in the form of X.509 digital certificates. Each time the license is used the license's signature is validated against the server's signature X.509 certificate to ensure that the license has been issued by a valid LS. At the option of the employing software application, the license may call the issuing LS to ensure that it is still valid and has not been revoked. Should the call to the server fail the application will be notified of this via the programming construct of an event. Finally, different cryptographic methodologies and cryptographic keys are used in the various stages of the license issuance process.

Another possible attack could occur via the copying a working database to a second machine. To thwart this, the client database contains unique data about the machine that the software is running on. Specifically the hard drive manufacturer's serial number for each of the drives installed in the computer and the MAC address of each of the computer's NIC cards. Each time the software is run the software will validate that the equipment that it is running on matches the data it has stored in it's database.

Another potential opening is the turning back of the system clock to perpetually stay within the license's allowed validity time when using a "software lease" or "restricted by time" license. Each time a license of this type is used the current system time is checked against the last used system time. If the current system time is greater than the last used system time the last used system time is updated to the current time. Each time the license is validated, which happens several times a minute, if the current system time is less than the last used system time, the license is expired.

In the case of the Network License Manager a need exists to balance the level of security prescribed by the employing software company and the level of effort required by administrators to register and maintain all possible users of the system with the NLM. To facilitate flexibility and security there are four methods provided by the NLM to allow users to make use of licenses from the NLM. These four methods exist strictly for usage of licenses from the NLM. Any administration of the NLM mirrors the same security protections that exist in the LS.

Now referring to FIGS. 9-14, the user interface is comprised of panes in four docking areas of the screen. A first area holds the explorer components 98 that are navigational in nature. A second area holds the editor components 89. The editor components are, as their name implies, used to create, edit, or remove information. Depending on the control this may be done via textual editing, or graphical composition such as report designer and workflow editor. A third area 90 holds the property editor and palette window, the palette windows is primarily used in the graphical composition editors. A fourth area displays the output of activities such as compiling a report.

The server explorer is the primary navigation tool of the desktop GUI and is comprised of servers registered with the IDE and belonging to two categories, The present invention License Servers and Network License Managers. These registered servers are displayed in a JTree control.

The root node of the tree is labeled "The present invention Servers". This root node contains 2 child nodes. The first of these child nodes is labeled "The present invention License Servers" and contains 0 . . . n child nodes, one for each of the license servers registered with the IDE. The second of theses child nodes is labeled "The present invention Network License Managers" and contains 0 . . . n child nodes, one for each of the network license manager servers registered with the IDE. In both cases the present invention's License Servers and the present invention's Network License Managers, the default text of the tree node is the same as the machine name of the registered server, however this label can be changed to an end-user defined value.

Sub-nodes common to both the "The present invention License Servers" node and the "The present invention Network License Servers" node are the "Customers", "Reports", "Users", and "Application Configuration" nodes. The "The present invention License Servers" sub-node also has 2 sub-nodes that are unique to the "The present invention License Servers" node. These two sub-nodes are the "Products" sub-node and the "Pending License Requests" sub-node. The "The present invention Network License Servers" sub-node also has 2 sub-nodes unique to it. These subnodes are the "License Pools" sub-node and the "Orphaned Licenses" sub-node.

This section enumerates the actions that the GUI takes when individual tree nodes are clicked upon. When the present invention License Servers node is left clicked, the "License Server List" editor is displayed in the editors pane of the GUI. When the present invention Network License Management Servers node is left clicked, the "Network License Management Servers List" editor is displayed in the editors pane of the GUI. Specific When a specific the present invention license server is selected from the list of the present invention license servers listed as children of the "The present invention License Servers" node, the "The present invention License Server" editor is launched and populated with the details of the server selected in the tree. When a specific the present invention network license management server is selected from the list of the present invention license servers listed as children of the "The present invention Network License Management Servers" node, the "The present invention Network License Management Server" editor is launched and populated with the details of the server selected in the tree. When a "Customers" node directly under a specific server is clicked, the Customers Editor is launched in the editors pane of the GUI and the customer list of the Customers Editor is populated with the customers registered with the specific server. When a "Users" node directly under a specific server is clicked, the Users Editor is launched in the editors pane of the GUI and the user list of the Users Editor is populated with the users registered with the specific server. When a "Products" node directly under a specific server is clicked, the Products Editor is launched in the editors pane of the GUI and the product list of the Products Editor is populated with the products registered with the specific server. Pending License Requests Node. When a "Pending License Requests" node directly under a specific server is clicked, the Pending License Requests Editor is launched in the editors pane of the GUI. When a "Server Configuration" node directly under a specific server is clicked, the Server Configuration Editor is launched in the editors pane of the GUI.

When a "TCP/IP Settings" node under a specific server is clicked, the TCP/IP Settings Editor is launched in the editors pane of the GUI and the TCP/IP settings for the selected server are populated in the editor. When a "Security Settings" node under a specific server is clicked, the Security Settings Editor is launched in the editors pane of the GUI and the Security settings for the selected server are populated in the editor. When a "Logging Settings" node under a specific server is clicked, the Logging Settings Editor is launched in the editors pane of the GUI and the Logging settings for the selected server are populated in the editor. When a "Database Settings" node under a specific server is clicked, the Database Settings Editor is launched in the editors pane of the GUI and the Database settings for the selected server are populated in the editor. When a "License Pools" node directly under a specific server is clicked, the License Pools Editor is launched in the editors pane of the GUI and the customer list of the License Pools Editor is populated with the customers registered with the specific server. When a "Orphaned Licenses" node directly under a specific server is clicked, the Orphaned Licenses Editor is launched in the editors pane of the GUI and the customer list of the Orphaned Licenses Editor is populated with the customers registered with the specific server. When the business rules tree node is clicked the system opens one of two different editor windows. If the selected scripting language is Java then a Java editor window that has the event functions already setup. If the scripting language is C++ then a C++ scripting window is opened. If the language is C# or VB or uses COM then the code will need to be written and compiled in Visual Studio, and is thus outside the scope of this IDE, however some mechanism to indicate which language the server should call to run the scripted business rules needs to be included.

Figure 9:
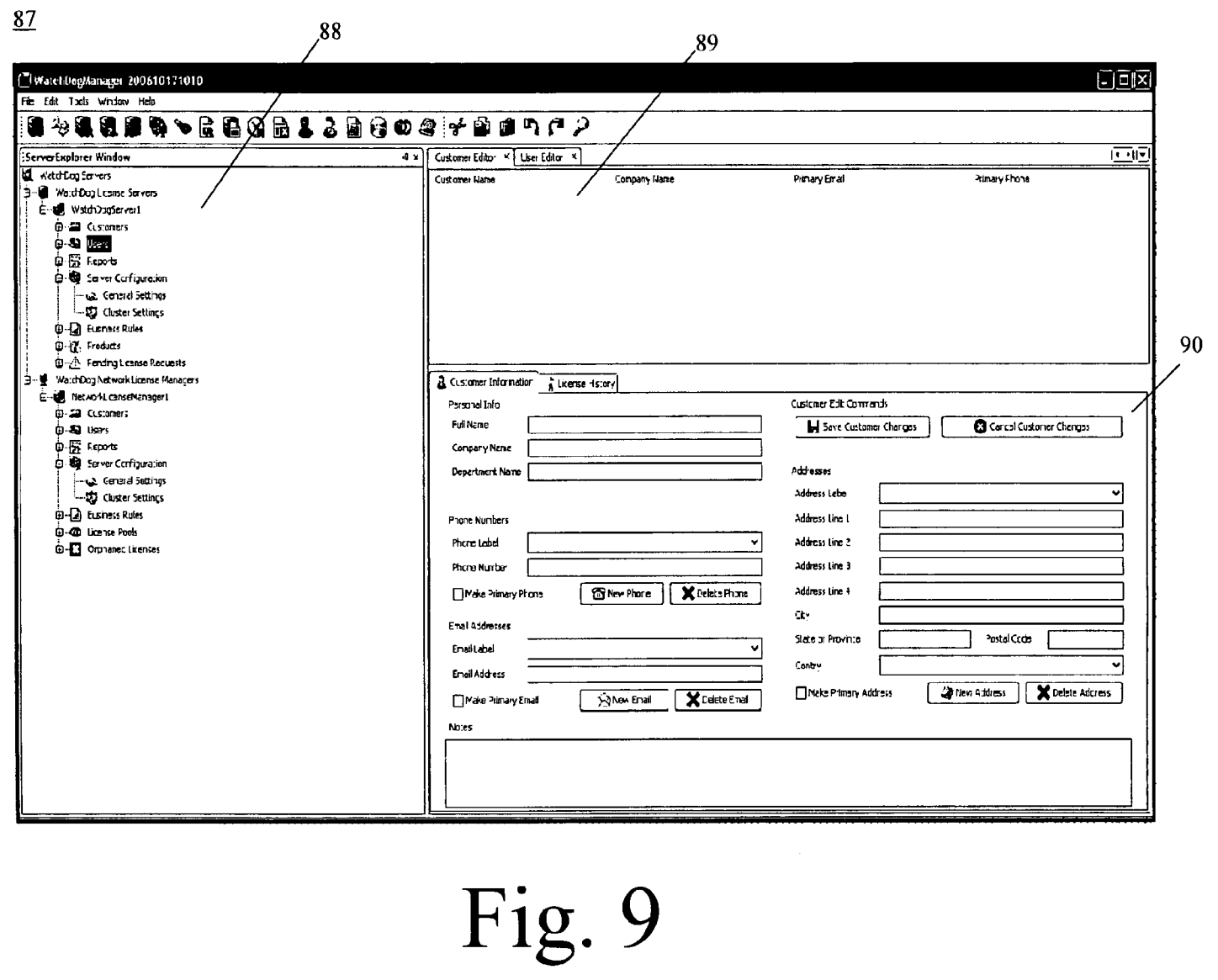
Figure 10:
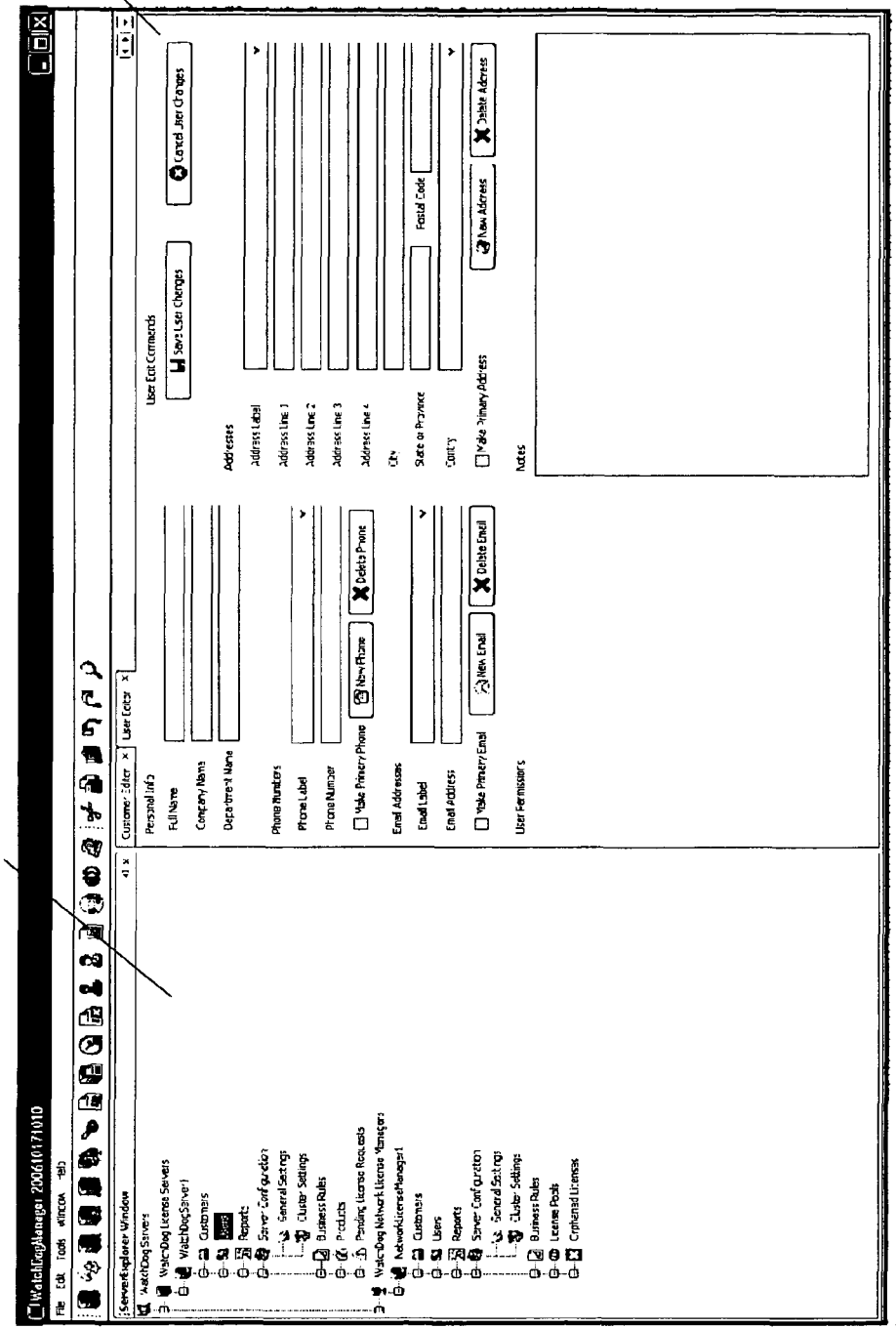
FIG. 10 is a screen shot of the GUI of the present invention showing the user editor.

Now referring to FIGS. 9 and 10, the customer editor 87 is used to enter or edit customer information as well as to view a license history for that customer. The editor is comprised of two major sections, which are the customer results grid section 89 and the customer details section 90. The customer details section is further broken down into two sections which are customer information, and the license history.

Figure 11:
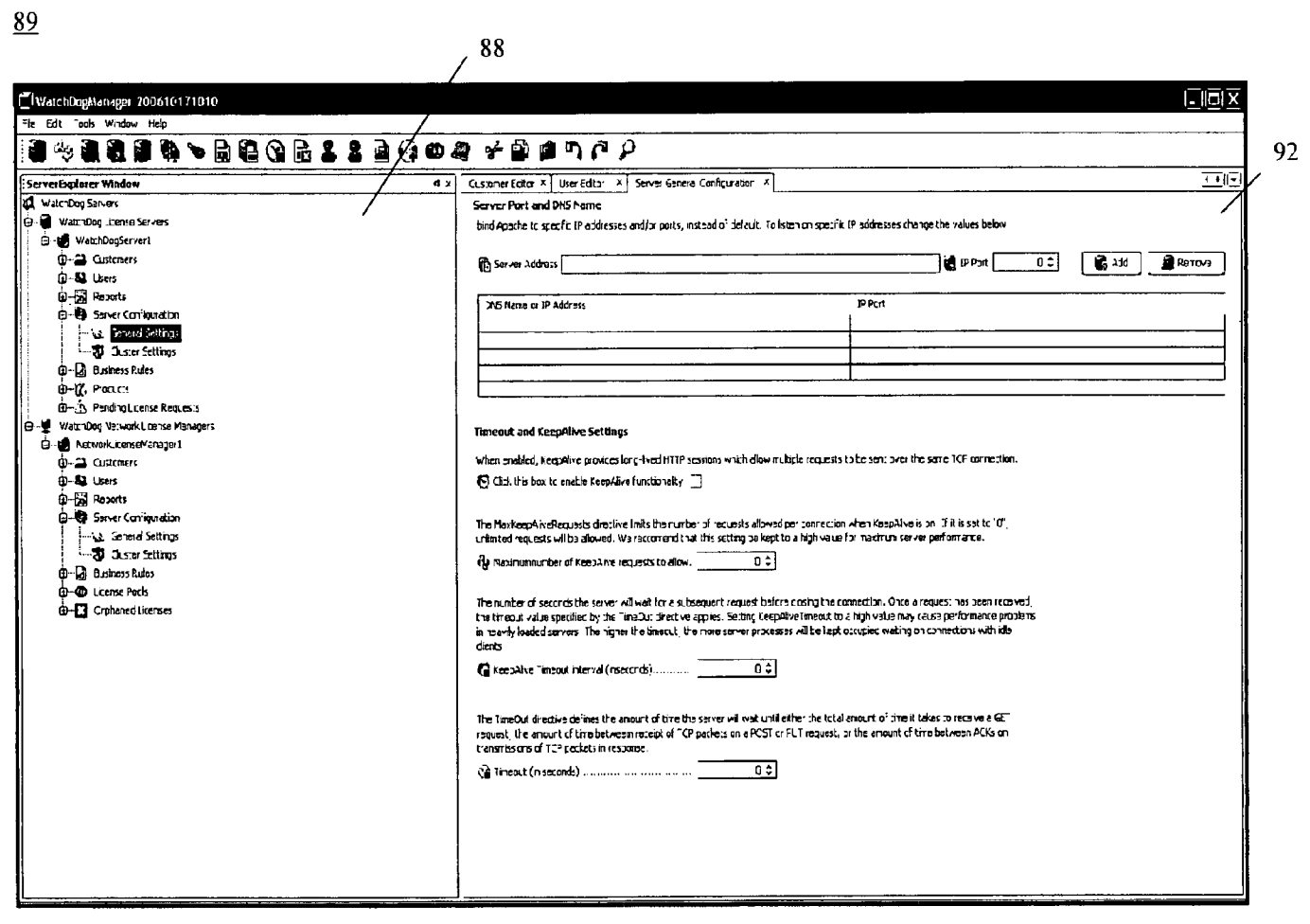

FIG. 11 illustrates the Sever General Configuration 89 which is displayed in a second area 92 and is comprised of Timeout and Keep Alive Settings.

Figure 12:
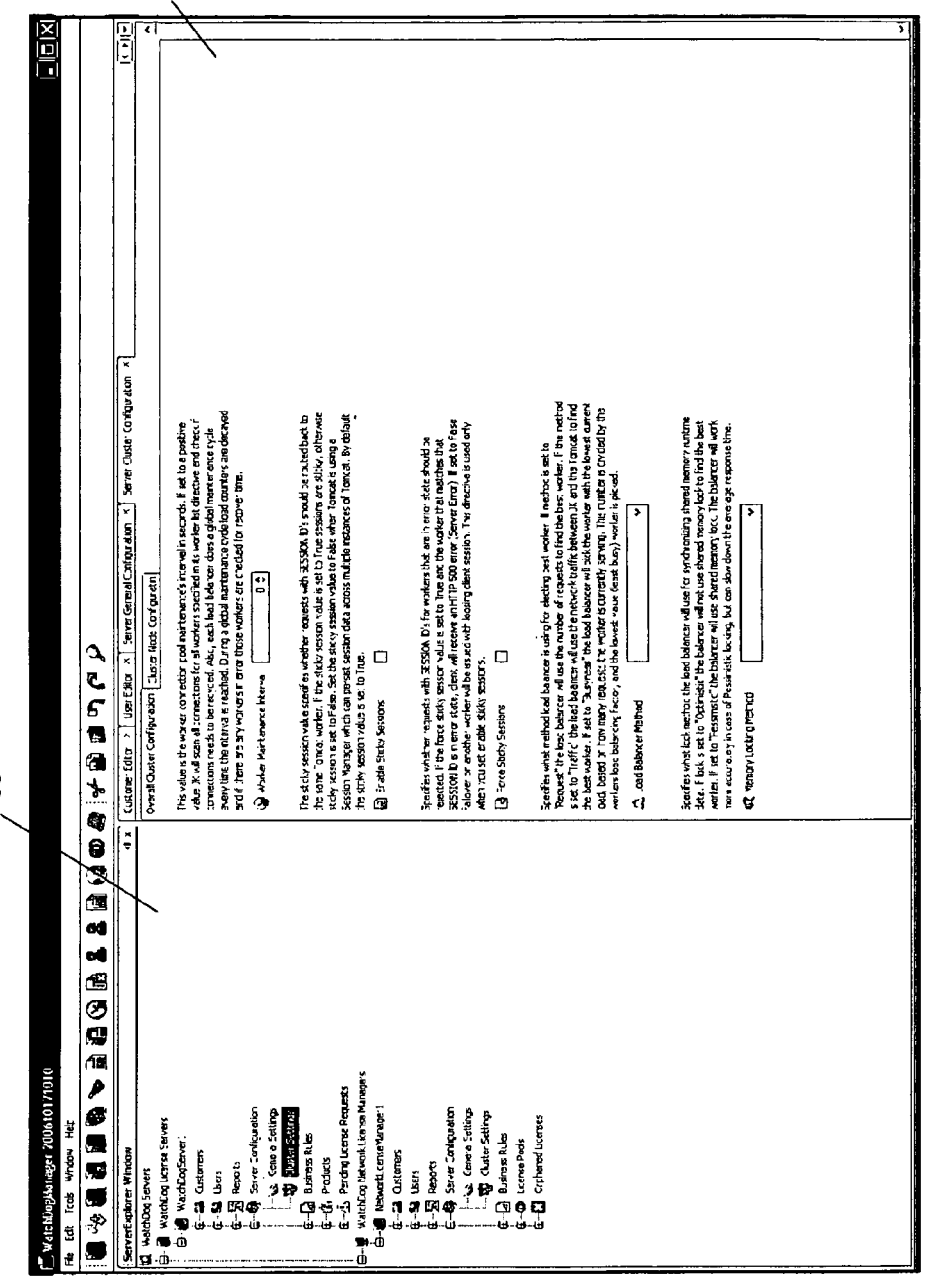
FIG. 12 is a screen shot of the GUI of the present invention showing the overall cluster configuration.
Figure 13:
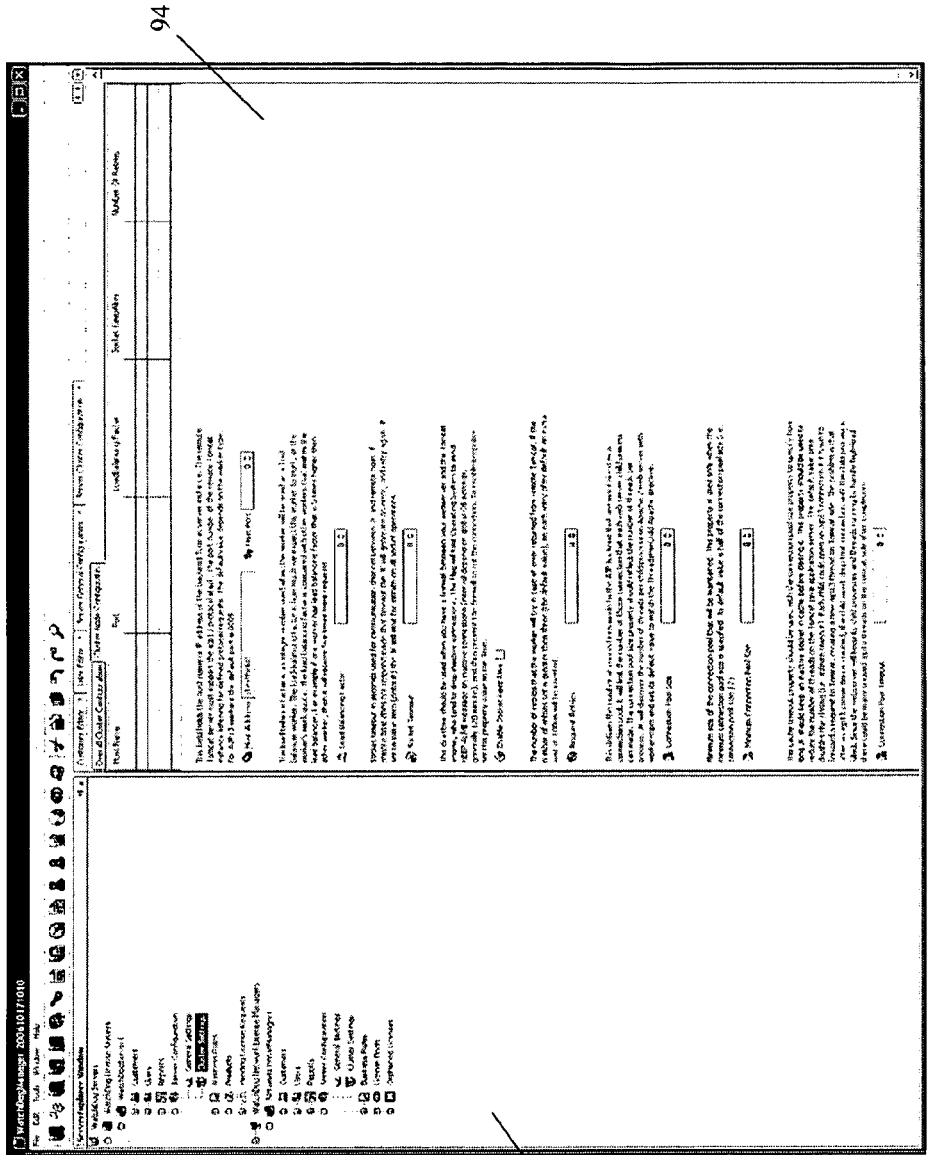
FIG. 13 is a screen shot of the GUI of the present invention showing the cluster node configuration.

Referring to FIGS. 12 and 13 the values in the Cluster Configuration heading 90 and 91 fall under one of two categories. These categories are "Overall Cluster Configuration" 93 and "Cluster Node Configuration" 94. The first of these, Overall Cluster Configuration 93 is represented in FIG. 12. This first category is comprised of five variables which are: Worker Maintenance Interval, Enable Sticky Sessions, Force Sticky Sessions, Load Balance Method, and Memory Locking Method. The second category is comprised of eight variable which are: host address, load balancing factor, socket timeout, enable socket keep alive, Request Retries, Connection Pool Size, Minimum Connection Pool Size, and Connection Pool Timeout.

Figure 14:
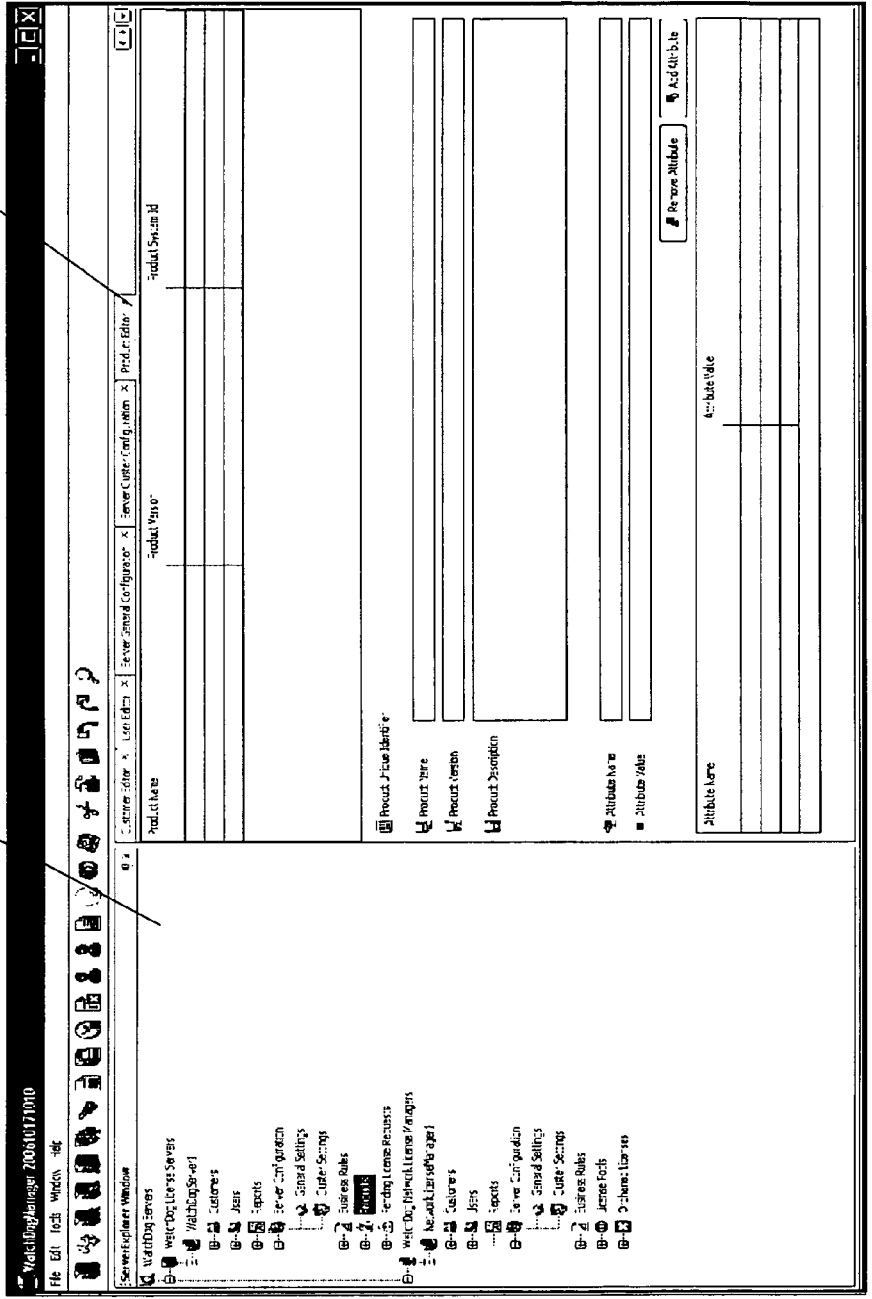
FIG. 14 is a screen shot of the GUI of the present invention showing the product editor.

Finally, FIG. 14 illustrates the Product Editor 92 which is displayed in a second area 95 and includes such variables as product name, product version, product system ID, product unique identification information and attribute fields.

There are 3 possible installation and deployment configurations for the present invention License Server and Network License Manager Server. These three configurations are: stand alone, cluster manager, and cluster worker.

The Stand Alone configuration installs both the Apache 2.0.x http server with the appropriate The present invention modules as well as the Apache Tomcat Java application server. In addition to these two applications the installation will also write out the appropriate configuration files (i.e. mod_jk.conf, httpd.conf, ssl.conf, nw_firewall.conf, etc).

The Cluster Manager configuration installs only the Apache 2.0.x http server without the present invention modules. The configuration files that are written are specific to the mod_jk clustering schema. These files are httpd.conf, ssl.conf, nw_firewall.com, mod_jk.conf and workers.properties.

The Cluster Worker configuration is virtually identical to the Stand Alone installation with the added requirement of informing the Cluster Manager of it's installation and providing its information to the Cluster Manager so that the Cluster Manager may update its configuration with the new worker data.

It is appreciated that the optimum dimensional relationships for the parts of the invention, to include variation in size, materials, shape, form, function, and manner of operation, assembly and use, are deemed readily apparent and obvious to one of ordinary skill in the art, and all equivalent relationships to those illustrated in the drawings and described in the above description are intended to be encompassed by the present invention.

Furthermore, other areas of art may benefit from this method and adjustments to the design are anticipated. Thus, the scope of the invention should be determined by the appended claims and their legal equivalents, rather than by the examples given.

The embodiments of the invention in which an exclusive property or privilege is claimed are defined as follows:

1. A program storage device readable by a machine, tangibly embodying a program of instructions executable by the machine to perform method steps for software license management and issuance, said method steps comprising:
    making an external request from a client server;
    selecting a client, a request for a local license, and customer registration to a license server;
    determining if the license has been tampered with;
    determining if the license has not expired;
    returning an error message if tampering or expiration is determined, otherwise continuing with the following method steps:
        initiating a request from a server side from either a request from the local license and customer registration or from an electronically transmitted file to a customer service representative;
        determining a request type and processing the license request to determine if a customer is registered;
            if the customer is not registered, a certificate and customer's public key is issued and sent to the client,
            if the customer is registered, the analysis of the license continues;
        determining if server will handle the product of the license request, and if so, the server will continue the analysis, but if not, the server will return a response indicating such to the client;
        if the server does handle the product and the customer is registered, the system places a call to the end user business rules script and determines if the request has been rejected; and
        if the request has been rejected a message will be sent to the client, and if not a determination on whether a license can be issued and the answer returned to the client.

2. The computer-readable medium of claim 1 wherein valid license types issued includes unrestricted, limited time evaluation, limited runs evaluation, software lease, and count uses.

3. The computer-readable medium of claim 2 wherein the unrestricted license type places no restrictions on how long the user of the license may continue to use the software.

4. The computer-readable medium of claim 2 wherein the limited time evaluation license will evaluate a license time duration, license time unit, and license timer start variables to create a time span that will then be compared against a current system time to determine if the license time period has been exceeded.

5. The computer-readable medium of claim 1 further comprising the steps of the client side server;
   receiving an input to start a selected client operation for a concurrent network license;
   immediately and directly accesses a network license manager for analysis of the request type and additional process steps of the network license manager; and
   sending a message to the client at the conclusion of the network license manager's processes.

6. The computer-readable medium of claim 1 further comprising the steps of the process of the network license manager
   creating a license pool comprising a group of licenses that are controlled and allowed to be used based on a set of configuration parameters
   said license pool consists of one or more subpools
   receipt of input to the network license manager;
   initiation of analysis of the request type to determine if the customer is registered is run;
      if the customer is not registered a certificate and customer's public key is issued and sent to the client, and the customer is registered;
      concurrently, the license is checked for valid credentials and caller permission to check out the license;
         if the license is invalid or the caller has no rights, a message is sent to the client;
   a check is done to determine if the license pool has any available licenses;
   if so, a valid license is marked in use and returned to the client;
   if the license pool does not have an available license an overflow pool is checked for available licenses;
      if an overflow pool license is available a valid license is marked in use and returned to the client in a message; and
      if no overflow pool license is available a message stating such is returned to the client.

7. The computer-readable medium of claim 1 further comprising the steps of the business rules callback processing, said business rules callback processing is accomplished via one of three options
   a first option wherein when the license server and network license manager starts,
      reading a directive named "BusinessRule" from a configuration file, said directive can have four values which are "UserCompiled", "Java", "DotNet", or "NotImplemented";
         in the case of "NotImplemented" the function will simply return immediately;
   a second option wherein the client side server and a user interface consists of three routines,
      a first routine wherein .NET code is written to the user interface, which is then compiled and uploaded to the server, and its compiled in to .NET assembly;
      a second routine wherein the of the code is written to the user interface, compiled, and then uploaded as a shared library or dll file to the server and its compiled object; and
      a third routine where the writing of the java code, which is then compiled and uploaded to the server as a Java class file.

8. The computer-readable medium of claim 7 wherein, on the server side,
   a server request is first received from a license client, which triggers a callback function;
   the configuration file next indicates that the server should use Java code and then uses a Business Rule Directive from the configuration file to determine if it should continue to use Java or switch to User Compiled or .NET to further process the request;
   if java is continued the system calls the java class with the serialized request and obtains if from the java class file;
   if the serialized request is to be processed via user compiled, the system calls out to the users compiled shared library and obtains the information from the complied object; and
   if the serialized request is to be processed via .NET, then the system calls out to the user's .NET assembly and obtains the information form the compiles .NET assembly.

9. The computer-readable medium of claim 1 comprising the following steps
   upon the client's receipt of a response message form the network license manager;
   if the response is based on invalid credentials, no rights, or no available license an error message is returned to the user;
   if the response is valid and a license is returned, the license is added to the active license list and time cycle is started in the license revalidation timer;
   when the timer cycle expires the first step is to determine if the license has expired since the last check;
      if the license has expired an error message is returned to the user;
      if it has not expired the next step is to determine if the network license manager can be contacted;
         if the network license manager can not be contacted, then a check is run to determine if the maximum number of missed network license manager updates limit has been exceeded,
         if not the process returns to the revalidation timer,
         if it has been exceeded an error message is returned to the user;
      if the network license manager is contacted, then a check to determine if the license has been reclaimed by the network license manager is run; and
      if the network license manager has reclaimed the license an error message is returned to the user, if not the process returns to the revalidation timer.

10. The computer-readable medium of claim 1 further comprising the additional steps when a customer service representative or other human interaction is required by a user;
- when a user starts the process on the client side and selects a client operation a request is made by file or an offline key request is submitted; and
- the file request is followed by a license request made by a file that is electronically transmitted to a customer service representative who then accesses the server, which results in the issuance of an offline license via file transactions.

11. The computer-readable medium of claim 1 further comprising the additional steps when a customer service representative or other human interaction is required by a user;
- an offline key request is provided to a customer service representative by the user so that the customer service representative can input the client key and license parameters and process offline the key request and generate and offline authorization code that is then provided to the user.

* * * * *